(12) United States Patent
Liden et al.

(10) Patent No.: US 8,799,379 B1
(45) Date of Patent: Aug. 5, 2014

(54) TAGGING OF ELECTRONIC MESSAGES

(75) Inventors: Lars H. Liden, Seattle, WA (US); David L. Holcombe, Mercer Island, WA (US); Adrian C. Quan, Bainbridge Island, WA (US); Garth A. Henson, Port Orchard, WA (US)

(73) Assignee: Amazon Technologies, Inc., Reno, NV (US)

( * ) Notice: Subject to any disclaimer, the term of this patent is extended or adjusted under 35 U.S.C. 154(b) by 655 days.

(21) Appl. No.: 12/979,940

(22) Filed: Dec. 28, 2010

(51) Int. Cl.
*G06F 13/00* (2006.01)

(52) U.S. Cl.
USPC .......................................................... 709/206

(58) Field of Classification Search
USPC ........................................................ 709/206
See application file for complete search history.

(56) References Cited

U.S. PATENT DOCUMENTS

2004/0215479 A1* 10/2004 Dorsey et al. .................... 705/1

* cited by examiner

*Primary Examiner* — Robert B Harrell
(74) *Attorney, Agent, or Firm* — Thomas | Horstemeyer, LLP

(57) ABSTRACT

An Email Service Provider (ESP) can generate tags for email messages that are received from senders, in addition to tags that are provided to the ESP by the senders. The ESP can send the email messages to selected potential recipients based on the tags that were provided by the senders and the tags that were generated by the ESP. Updating of selected tags by recipients may also be provided. The tags can be dynamic, derived and/or static tags.

28 Claims, 5 Drawing Sheets

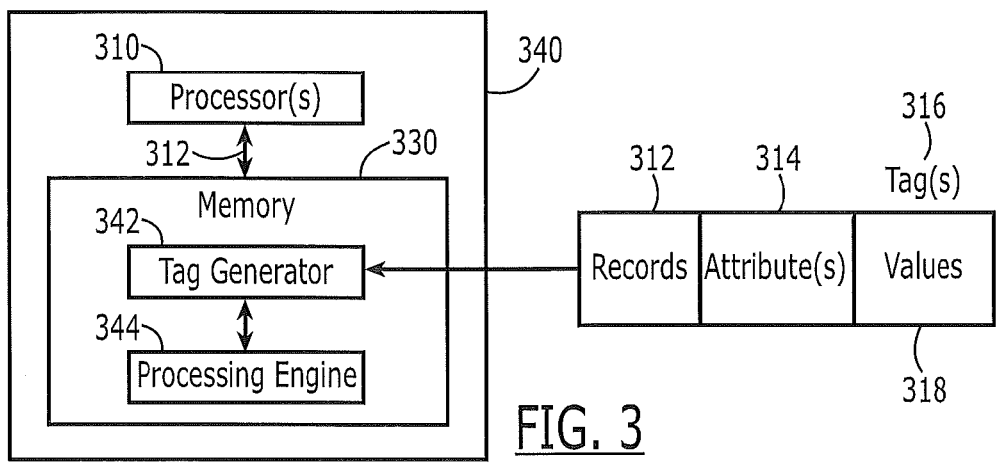
FIG. 3
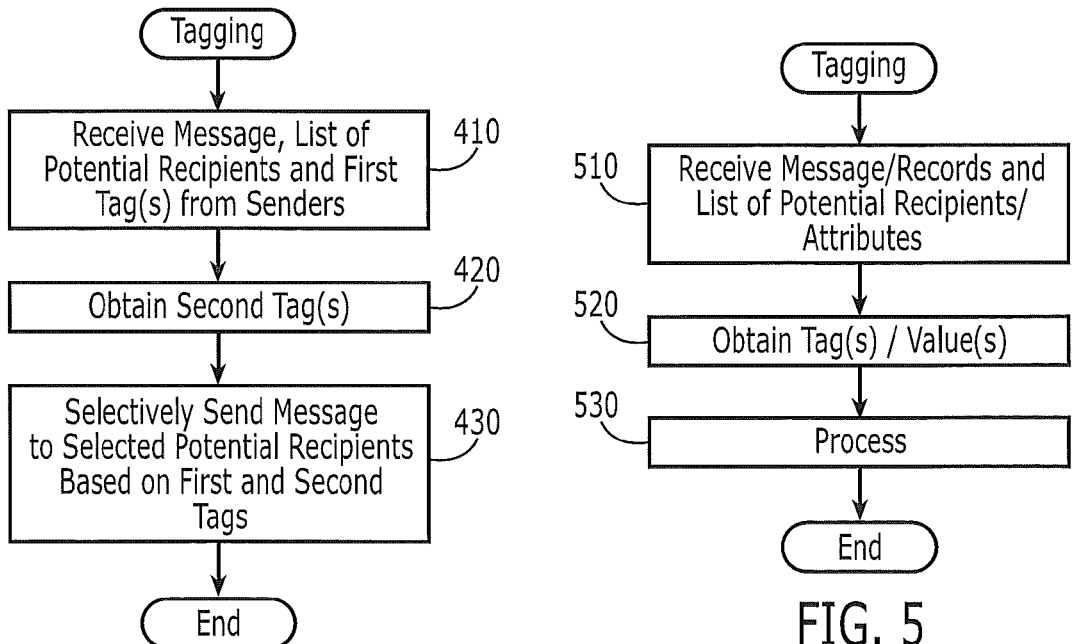
FIG. 4
FIG. 5

TAGGING OF ELECTRONIC MESSAGES

BACKGROUND

Online buying and selling of products and services over computer networks, such as the Internet, have continued to proliferate with widespread Internet usage. In order to facilitate the sale of products and services, online sellers of products and services often design marketing campaigns wherein a given campaign message, such as an email, text message and/or instant message, is sent to a given set of recipients.

With the proliferation of email marketing, an industry of Email Service Providers (ESPs) has emerged. An ESP is an entity that provides email marketing or bulk email services. An ESP may provide tracking information showing the status of email sent to each member of an address list. ESPs also often provide the ability to segment an address list into interest groups or categories, allowing a sender to send targeted information to recipients who they believe will value the email. ESPs typically upload subscriber lists from senders for distributing email messages. The lists may be enhanced with custom fields in order to hold additional information for each subscriber for filtering and targeted messaging purposes. A sending engine also may be provided to allow senders to distribute their messages to the subscribers via the ESP.

BRIEF DESCRIPTION OF THE DRAWINGS

FIG. 3 is a block diagram of a message server or data processor according to various embodiments described herein.

FIGS. 4 and 5 are flowcharts of operations that may be performed to tag messages according to various embodiments described herein.

DETAILED DESCRIPTION

Figure 1:
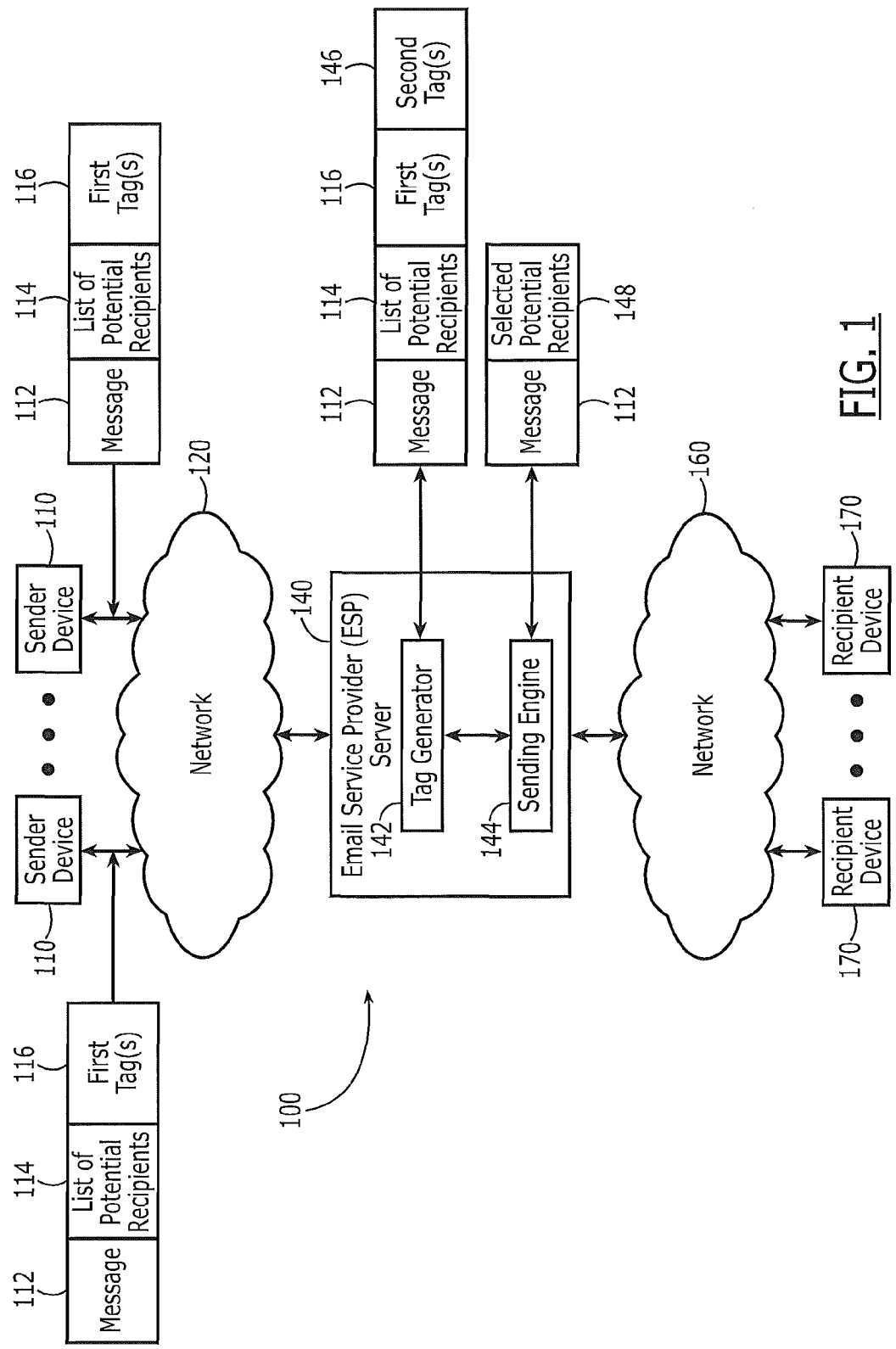
FIG. 1 is a block diagram of systems, devices, methods and computer program products for tagging email messages by email service providers according to various embodiments described herein.

Various embodiments described herein can allow an Email Service Provider (ESP) to generate tags for email messages that are received from senders, in addition to tags that are provided to the ESP by the senders. The ESP can selectively send the email messages to selected potential recipients based on the tags that were provided by the senders and the tags that were generated by the ESP. The ESP can thereby generate additional value for both the senders and the potential recipients by providing additional selectivity of the potential recipients based on the tags that are generated by the ESP. The senders can thereby obtain more focused targeting and the recipients can thereby receive email messages that are more directly targeted to them.

An ESP server for sending email messages from senders to recipients, according to various embodiments described herein, may include an email message receiver, a tag generator and an ESP sending engine. The email message receiver is configured to receive an email message and a list of potential recipients for the email message from a sender. The list of potential recipients includes a first tag associated therewith that describes a characteristic of the potential recipient. The tag generator is configured to obtain a second tag for the list of potential recipients that describes a characteristic of the potential recipients and that is different from the first tag. The ESP sending engine is configured to selectively send the email message that is received from the sender to selected potential recipients in the list of potential recipients in response to the first tag that was received from the sender and the second tag that was obtained by the tag generator. The first and second tags may be analyzed by the sender and/or the ESP server to select the potential recipients.

Various types of tags may be provided or generated by the sender and/or by the ESP according to various embodiments described herein. These tags may be referred to as dynamic tags, derived tags and explicit tags. Dynamic tags have a value that changes over time based upon a characteristic of the potential recipient at a given time. Derived tags have a value that is calculated for the potential recipient from the characteristics that were provided. Moreover, derived and dynamic tags may be generated that have a value that is calculated for the potential recipient and that changes over time based on a characteristic of the potential recipient at a given time. Finally, explicit tags have values that are not calculated and that do not change due to passage of time.

Various examples of dynamic tags will now be described. For example, the characteristic of the potential recipient can comprise a geolocation of the potential recipient, such as an address, zip code or Internet Protocol (IP) address, and the dynamic tag can comprise a weather-feature tag, such as whether the potential recipient is currently in a warm, cold, snowing, raining, clear, etc. weather pattern. The characteristic of the potential recipient may comprise a birth date of the potential recipient, and the dynamic tag can comprise an age or an age range tag. The characteristic of the potential recipient can comprise an email response history of the potential recipient, and the dynamic tag can comprise an email responsiveness tag. Finally, the characteristic of the potential recipient can comprise social networking data, and the dynamic tag can comprise a degree of influence tag.

Various embodiments of derived tags will now be described. For example, the list of potential recipients can include the geolocation of the potential recipient, such as an address, zip code and/or IP address of the potential recipient, and the derived tag can comprise a population density tag, such as urban, suburban or rural, and/or a topography-feature tag, such as coastal or mountains. In other embodiments, the list of potential recipients includes names of the potential recipients, and the derived tag can comprise a gender, marital status and/or ethnicity of the potential recipients that is calculated or predicted from the first and/or last name of the potential recipients.

The first and/or second tags may also be explicit tags having values that are not calculated and that are static in time.

The tags may be used internally by the email sender and/or the ESP. However, in other embodiments, at least some of the first and/or second tags may be sent to the selected potential recipients, along with the email message and/or separate from the email message. Moreover, the email sending engine may be further configured to receive a message from a selected potential recipient to change the first and/or second tag that was sent. For example, a derived tag that calculated the gender, marital status and/or ethnicity of the potential recipient based on the potential recipient's first or last name may be incorrect, and the potential recipient may choose to update this tag. The email sending engine can be configured to change the first and/or second tag for the selected potential recipient in response to the message. Other tags may not be sent to the potential recipient and/or may not be updateable by the potential recipient.

The ESP server also may include an analysis engine that is configured to analyze responsiveness of the potential recipients to the emails that were sent, as a function of the first and/or second tags.

Tagging may also be used outside the ESP environment and/or for electronic messages other than emails. For example, an electronic message server for sending electronic messages to recipients may include an electronic message receiver that is configured to receive an electronic message and a list of potential recipients for the electronic message from a sender. The list of potential recipients also includes a first tag associated therewith that describes a characteristic of the potential recipients. A tag generator is configured to obtain a second tag for the list of potential recipients that describes a characteristic of the potential recipients and that is different from the first tag. A sending engine is configured to selectively send the electronic message that is received from the sender to selected potential recipients in the list of potential recipients in response to the first tag that was received from the sender and the second tag that was obtained by the tag generator. The electronic messages may include email, voicemail, text messages and/or multimedia messages.

Moreover, a tag generator may be provided outside the context of separate senders and service providers. For example, an electronic message server may include an electronic message receiver that is configured to store an electronic message, a list of potential recipients for the electronic message and an associated characteristic of the potential recipients in the list. A tag generator is configured to generate a tag for the list of potential recipients from the associated characteristic of the potential recipients that is stored. A sending engine is configured to selectively send the electronic message to selected potential recipients in the list of potential recipients in response to the tag that was generated by the tag generator. Dynamic, derived and/or static tags, and/or recipient feedback may be provided according to any of the embodiments described herein.

Dynamic tags and derived tags may also be used in other environments. For example, a dynamic tag generator may be configured to generate a dynamic tag for a list of potential recipients from a characteristic that is associated with the potential recipients, wherein the dynamic tag for a given recipient has a value that changes over time. Values of the dynamic tag for the potential recipient may then be updated based on a current time, and an electronic message may be sent at the current time in response to the dynamic tag, the value of which was updated based on the current time. Moreover, a derived tag generator can be configured to calculate a derived tag for the list of potential recipients from the associated characteristic of the potential recipients in the list, and the electronic message may selectively sent to selected potential recipients in response to the derived tag.

Finally, tagging may be also be used within the context of data processing of records. For example, some embodiments can provide a data processing method that includes various operations that are performed on a data processing system. Records are stored along with an associated value of an attribute for a respective record. A tag is generated based on the attribute. A value of the tag is calculated for a respective record. The value of the tag that was calculated is associated with the respective record. The records are then processed based on the value of the tag that is associated with a respective record. The tags may be derived, dynamic and/or static tags, as was described herein.

Accordingly, various embodiments described herein may allow an ESP to add value to ESP marketing by allowing the ESP to add its own tags, such as dynamic, derived and/or static tags, to the tags that are provided by a sender. This technology can benefit the senders as well as the recipients. Disruptive technology in the context of email marketing may thereby be provided.

Overall Architectures

FIG. 1 is a block diagram of systems (including devices, such as servers or recipient devices), methods and/or computer program products for email marketing using tags, according to various embodiments described herein. These systems, devices, methods and computer program products 100 receive email messages and a list of potential recipients for the email messages from one or more senders, and ultimately selectively send the email messages that are received from the senders to selected potential recipients based on first tags that are received from the senders and second tags that are generated by the ESP.

As used herein, a campaign generally refers to a single message or a series of related messages that is delivered to many recipients. The message(s) may have identical content for all recipients in some embodiments. However, in other embodiments, the content in the message(s) may be varied depending upon the campaign delivery technique and/or the recipient device capabilities. In yet other embodiments, the content in a campaign message may be personalized for the individual recipient. For example, a readable campaign message may be delivered via email, text message, short message and/or a social networking interface, whereas an audible message may be delivered by voice mail, among other possibilities. As such, although the message may relate to a single campaign, such as a sales campaign for a given book, the content of the message may vary depending upon the mode of delivery. Moreover, recipient devices may generally range from desktop, notebook, netbook, laptop, smartphone, electronic book reader, game console and/or any other embedded device(s) having different processing, connectivity and/or user interface capabilities. As such, the campaign message may also be tailored to the type of recipient device.

A given campaign may be initiated manually and/or programmatically, and may be valid for a short period of time, such as a single day, or for a longer period of time, such as days, weeks, months or more. Moreover, for a given campaign, a list of potential recipients is generated. The list of potential recipients may be generated using various techniques such as the recipient opting into a related campaign, analysis of recipients prior purchasing or browsing activity, and/or random techniques, among other possibilities.

Referring again to FIG. 1, the email messages may originate from one or more sender devices 110. Each sender device 110 may be embodied by one or more enterprise, application, personal, pervasive and/or embedded computer systems that may be standalone and/or interconnected by a public and/or private, wired and/or wireless, real and/or virtual network including the Internet. For shorthand, a sender device 110 may also be referred to herein simply as a "sender" 110. The campaigns may be originated within an enterprise that is selling given goods and/or services or sending messages for other purposes (e.g., news, jokes, social networking, etc.)

and/or by third parties external to the enterprise who are selling their goods and services and/or sending messages via the enterprise.

As shown in FIG. 1, a given campaign may include a campaign message 112, a list of potential recipients 114 associated therewith, and one more first tags 116 associated therewith that describe a characteristic of the potential recipients. Various examples will be provided below. It will also be understood that different parties may generate the campaign message 112, the list of potential recipients 114 and the first tag(s) 116. For example, a third party vendor may originate the campaign message 112, but the selling enterprise may originate the list of potential recipients 114 and/or the first tag(s) 116. In other embodiments, the list of potential recipients 114 and/or the first tag(s) 116 may be jointly generated by the campaign originator, based on prior campaigns with other sellers and/or by the seller based on prior campaigns of other campaign originators.

An ESP server 140 may be used to generate one or more second tags 146 for a respective email message 112 that is received from the senders 110, and to selectively send the email messages 112 that are received from the senders 110, to selected potential recipients 148 at recipient devices 170 in response to the first and second tags 116 and 146. The senders may communicate with the ESP server 140 over a network 120, such as a public and/or private, wired and/or wireless, real and/or virtual network including the Internet.

Continuing with the description of FIG. 1, the ESP server 140 may include an ESP tag generator 142 that is configured to obtain one or more second tags 146 for the list of potential recipients 114 that describe a characteristic of the potential recipients and that is different from the first tag(s) 116. The second tag(s) 146 may be obtained from another source and/or may be obtained via internal generation by the tag generator 142. An ESP sending engine 144 is configured to send the email messages that are received from the senders 110 to selected potential recipients 148 at selected recipient devices 170 in response to the first and second tags. The potential recipients 148 may be selected by analyzing the first and second tags by the ESP server 140, by the sender device 110 and/or by another device that performs the analysis. The ESP server 140 may communicate with the recipient devices 170 over a network 160, which may be a public and/or private, wired and/or wireless, real and/or virtual network including the Internet, and which may be the same as and/or different from network 120.

The ESP server 140, the rating generator 142 and/or the sending engine 144 may be embodied as one or more enterprise, application, personal, pervasive and/or embedded computer systems that may be standalone and/or interconnected by a public and/or private, real and/or virtual, wired and/or wireless network including the Internet.

Finally, a plurality of recipient devices 170 receive the messages. It will be understood that each of the recipient devices 170 may be embodied as one or more enterprise, application, personal, pervasive and/or embedded computers, such as a desktop, notebook, netbook, laptop, smartphone, electronic book reader, game console and/or any other embedded device. Moreover, a given user may own one or more recipient devices 170 of various configurations and/or may log on to a recipient device that is owned and/or controlled by another entity. For shorthand, a recipient device 170 may also be referred to herein simply as a "recipient" 170.

Figure 2:
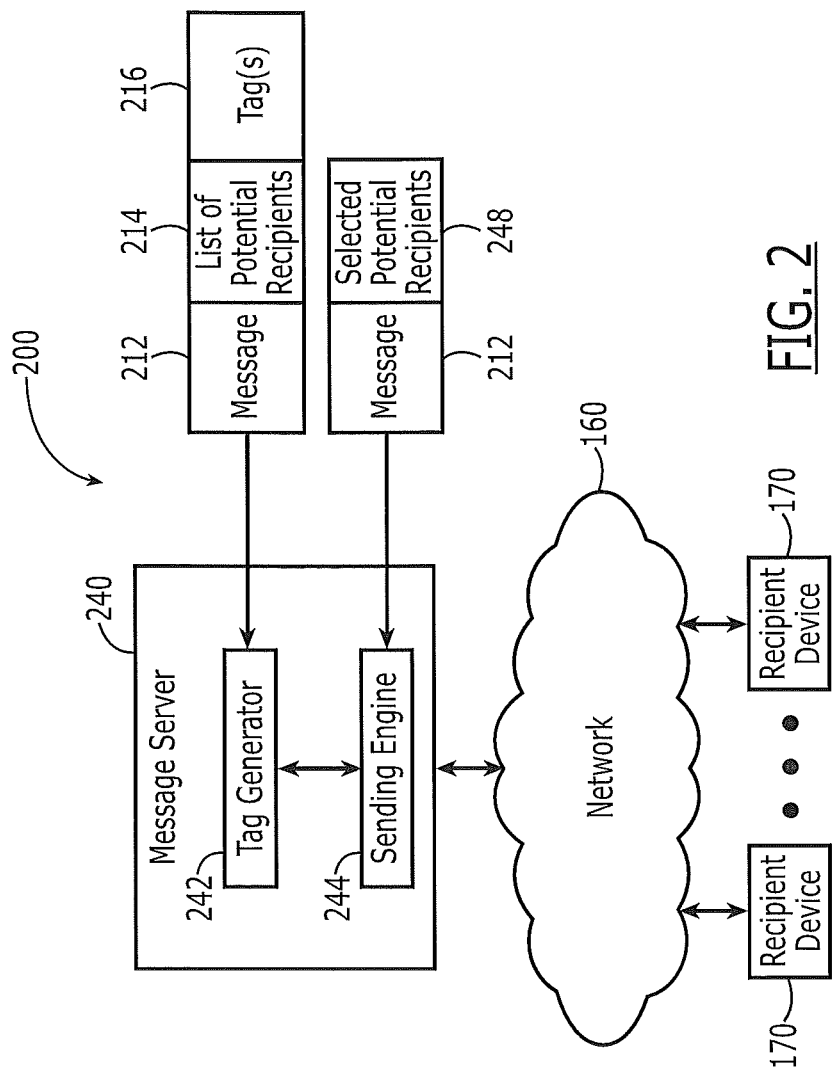
FIG. 2 is a block diagram of systems, devices, methods and computer program products for tagging messages by message senders according to various embodiments described herein.

FIG. 2 is a block diagram of systems (including devices, such as servers), methods and/or computer program products for selectively sending electronic messages based on tags according to various other embodiments described herein. These systems, devices, methods and computer program products 200 can selectively send electronic messages including email, voicemail, text messages and/or multimedia messages to a plurality of recipient devices 170 over a network 160 based on one or more tags 216, such as the first and/or second tag(s) 116 and 146 of FIG. 1 according to various embodiments described herein. For shorthand, electronic messages may also be referred to herein simply as "messages".

More specifically, a message server 240 includes a tag generator 242 that is configured to generate one or more tag(s) 216 for the list of potential recipients 214, and a sending engine 244 that is configured to selectively send the electronic messages to selected potential recipients 248 from the list of potential recipients 214 based on the tag(s) 216 that were generated by the tag generator 242. In embodiments of FIG. 2, the electronic messages may originate from within the message server 240. However, in other embodiments, the messages may originate from senders 110 that are external of the message server 240, as was illustrated, for example, in FIG. 1. The message server 240, the tag generator 242 and/or the sending engine 244 may be embodied as one or more enterprise, application, personal, pervasive and/or embedded computer systems that may be standalone and/or interconnected by a public and/or private, real and/or virtual, wired and/or wireless network including the Internet. Accordingly, embodiments of FIG. 2 may provide a non-ESP architecture.

FIG. 3 is a block diagram of a data processing system/method/computer program product 340, such as may be embodied by an ESP server 140 of FIG. 1 or an electronic message server 240 of FIG. 2. The system/method/computer program product 340 may include a processor 310, such as one or more enterprise, application, personal, pervasive and/or embedded computer systems that may be standalone and/or connected by a wired and/or wireless, real and/or virtual, public and/or private network including the Internet. A bus 312 connects the processor with one or more memory devices 330 which may include solid state memory devices (such as static, dynamic, volatile and/or non-volatile solid state memory devices) and/or movable memories (such as rotatable magnetic and/or optical memory devices in the form of discs and/or tapes). The memory devices 330 may be arranged in a hierarchy of devices and may be standalone and/or connected by a wired and/or wireless, real and/or virtual, public and/or private network including the Internet. The memory devices 330 may store a tag generator 342, such as tag generator 142 of FIG. 1 or 242 of FIG. 2, and a processing engine 344, such as sending engine 144 of FIG. 1 or 244 of FIG. 2. The tag generator 342 and/or the processing engine 344 may be embodied by computer-readable program code. However, in other embodiments, the tag generator 342 and/or processing engine 344 may be embodied, at least in part, by special purpose hardware including application-specific integrated circuits.

The data processing system/method 340 may be configured to store a plurality of records 312 which may comprise the messages 112 of FIGS. 1 and/or 2, and an associated value of an attribute 314 for a respective record 312, which may correspond to the list of potential recipients 114 of FIGS. 1 and/or 2. The records may be keyword search results in some embodiments. The tag generator 342 is configured to generate a tag 316 that is based on the attribute 314, which may correspond to the tags 116, 146 and 216 of FIGS. 1 and/or 2. The tag generator 342 is also configured to calculate a value 318 of the tag 316 for a respective record 312, which may correspond to values of the tags 116, 146 and/or 216 of FIGS. 1 and/or 2. The value 318 of tag 316 is then associated with the respective record 314, as shown in FIG. 3. The processing engine 344 processes the records 312 based on the value 318 of the tag 316 that is associated with a respective record.

ESP Tagging

FIG. 4 is a flowchart of operations that may be performed to send email messages from senders to recipients based on tags according to various embodiments described herein. These operations may be performed by an ESP server 140 of FIG. 1.

Referring to Block 410, a message, such as an email message 112 of FIG. 1, a list of potential recipients, such as the list of potential recipients 114 of FIG. 1, and first tags, such as first tags 116 of FIG. 1, are received. At Block 420, second tags, such as the second tags 146 of FIG. 1, are obtained, for example by generating these second tags 146 in a tag generator 142. Finally, at Block 430, the email message 112 is selectively sent to selected potential recipients, such as the selected potential recipients 148 of FIG. 1, based on the first and second tags, such as the first tags 116 and the second tags 146 of FIG. 1. The potential recipients 148 may be selected by analyzing the first and second tags by the ESP server 140, by the sender device 110 and/or by another device that performs the analysis. Various detailed embodiments will be described below.

Tagging in Non-ESP Environments

FIG. 5 is a flowchart of operations that may be performed to generate tags according to various embodiments described herein, outside the ESP environment. These operations may be performed by a message server 240 of FIG. 2 and/or by a data processing system/method 340 of FIG. 3.

Referring now to Block 510, a message, such as an electronic message 212 of FIG. 2 or a record 312 of FIG. 3, is obtained along with a list, such as the list of potential recipients 214 of FIG. 2, or the list of attributes 314 of FIG. 3. Then, at Block 520, tags, such as tags 216 of FIG. 2, and/or values, such as values 318 of FIG. 3, are obtained, for example, by calculating. The messages 212 and/or records 312 are processed, for example by selectively sending the message 212 to selected potential recipients 248 in response to the tags 216 of FIG. 2 or by processing the records 312 based on the value 318 of the tag 316 that is associated with a respective record 312 of FIG. 3.

As noted above, the tags that are obtained and/or generated by FIGS. 1-5 may be explicit tags, dynamic tags and/or derived tags. Explicit tags have values that are not calculated, and that do not change solely due to passage of time. Examples of these explicit tags are a name or address of the potential recipient. Although the name and/or address of a potential recipient may be changed by a potential recipient communicating with a message sender, the message sender typically would not change these explicit tags based on calculations by an ESP server or message server, or based only on passage of time.

In contrast, dynamic and derived tags have values that change over time and/or are calculated by the ESP and/or message sender, as will now be described.

Dynamic Tags

Figure 6:
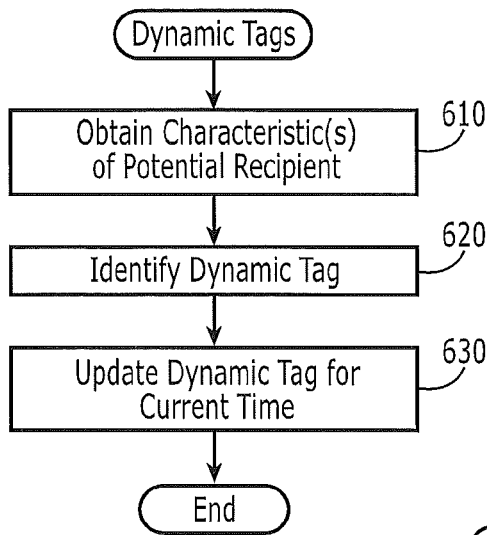
FIG. 6 is a flowchart of operations that may be performed to generate dynamic tags according to various embodiments described herein.

FIG. 6 is a flowchart of operations that may be performed to generate dynamic tags according to various embodiments described herein. These operations may be performed by the tag generator 142, 242 or 342 or FIG. 1, 2 or 3, respectively, by Block 420 of FIG. 4 and/or by Block 520 of FIG. 5.

Referring to FIG. 6, at Block 610, characteristics of the potential recipient and/or records and attributes are obtained. At Block 620, a dynamic tag is identified and a formula for deriving the dynamic tag may be generated. At Block 630, the dynamic tag is then updated for a current time.

Various embodiments of dynamic tags will now be described. These embodiments shall not be construed as limiting.

For example, in some embodiments, the characteristic of the potential recipient comprises a geolocation of the potential recipient. The geolocation may be expressed as an address (for example, a street address and a city/state and/or a zip code) of the potential recipient, a Metropolitan Statistical Area (MSA) of the potential recipient, an IP address of the potential recipient and/or other geolocation characteristic of the potential recipient. The dynamic tag may comprise a weather-feature tag that changes over time. Examples of these weather-feature tags include cold/hot, precipitation/clear, rain/snow. Values for these tags may be obtained by applying the geolocation to current and/or forecasted weather data for the given geolocation. The weather-feature tag may be updated for a current time, to provide a current weather and/or a predicted weather at a given time, and this updated value may govern the selective sending of messages to selected potential recipients. In a more specific example, a campaign may be for cold weather clothing, and the campaign message may be selectively sent to recipients that are presently in a cold weather environment. In another embodiment, the campaign message may be for rain gear, and the precipitation/clear tag may be used to select potential recipients.

In another example, the characteristic of the potential recipient comprises a birth date of the potential recipient. The dynamic tag may comprise an age and/or an age range tag. This tag can be updated at the time of sending the campaign message to identify the potential recipients. For example, the campaign may be for video games, and it may be desired to send the message to potential recipients who are under the age of 30. In another alternative, the campaign may relate to senior citizens, and it is desired to send the message to potential recipients who are over the age of 55.

In yet another example, the characteristic of the potential recipient comprises an email response history, such as a listing of marketing email messages that were received and whether the email marketing messages were opened or resulted in a purchase. The dynamic tag may comprise an email responsiveness tag, such as "opens more than 50% of mail" or "bought in the last 30 days". At any given time, the tag may be updated and email messages may be selectively sent based on the updated tag.

In yet another example, the characteristic of the potential recipient may be social networking data, such as the number of social network friends and/or the number of social network communications in a given time period, and the dynamic tag may comprise a "degree of influence" tag. Accordingly, a degree of influence may be calculated at a current time and messages may be selectively sent based on the degree of influence tag.

Moreover, dynamic tags may also change as a function of the rate of change of a metric as a function of time, which may also be referred to as a "velocity" of a metric as a function of time. For example, the weather feature tags that were described above may be calculated based upon a rate of change in the weather feature. Similarly, the email response history tag may look at changes in opening of email or changes in buying patterns over time. Finally, social networking tags, such as a "degree of influence" tag, may be based on a rate of change in the degree of influence over time. Dynamic tags may also be based on a change in the rate of change or "acceleration" trends as a function of time.

Derived Tags

Figure 7:
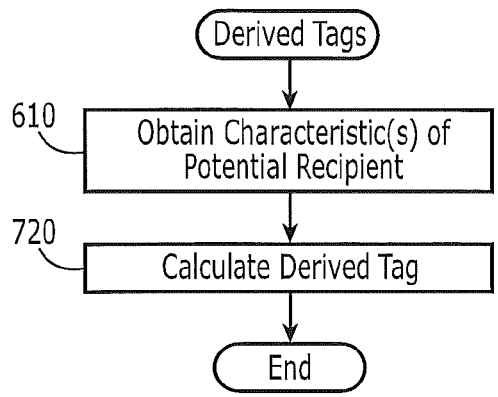
FIG. 7 is a flowchart of operations that may be performed to generate derived tags according to various embodiments described herein.

FIG. 7 is a flowchart of operations that may be used to calculate derived tags according to various embodiments described herein. These operations may be performed by the tag generator 142, 242 or 342 or FIG. 1, 2 or 3, respectively, by Block 420 of FIG. 4 and/or by Block 520 of FIG. 5.

More specifically, referring to FIG. 7, the characteristics of the potential recipient are obtained at Block 610, as was described above in connection with FIG. 6. Then, at Block 720, a derived tag is calculated for the potential recipient from the characteristic(s) of the potential recipient.

Various embodiments of derived tags will now be described. These embodiments shall not be construed as limiting.

In some embodiments, the list of potential recipients comprises a geolocation of the potential recipient. Geolocation may be identified as was described above. The derived tag may comprise a population density tag and/or a topography-feature tag. The population density tag may include an urban/suburban/rural tag, and may be identified by processing the geolocation data for the potential recipient against MSA data. A topography-feature tag may include tags such as coastal/interior or mountains/flat. The topography feature may be obtained by a comparing the geolocation of the potential recipient with topographical data. In specific examples, a campaign may be for a lawn mower and the campaign messages may be selectively sent to potential recipients that have a population density tag of "suburban". In another example, the campaign messages may be for swimwear, and the campaign message may be selectively sent to potential recipients who have a topography feature of "coastal". In yet another example, the campaign message may relate to ski equipment, and the campaign message may be selectively sent to potential recipients having a topography feature tag of "mountains". In these and other embodiments, the topography tag may be based on a distance, such as a distance from a ski resort, a beach or a snorkeling area.

In another example, the list of potential recipients may comprise a name of the potential recipient. The derived tag may comprise a gender, marital status and/or ethnicity of the potential recipient. Specifically, the tag may not have a gender identifier, but the gender may be predicted by calculation from the first name of the potential recipient. Similarly, a marital status, such as "Ms." or "Mrs." may not be provided, but a marital status may be predicted by determining whether the potential recipient's last name is hyphenated. Similarly, although ethnicity may not be provided, ethnicity may be predicted from the first and/or last name of the potential recipient. In some embodiments, the derived tag may also be accompanied by a confidence rating that indicates a degree of confidence in the prediction. In still other embodiments, the value of a given tag can be "unknown" for a given recipient.

It will be understood that the derived tags may be changed by a recipient, for example based on a miscalculation of the derived tags or a change in marital status of the potential recipient. However, these derived tags may be initially calculated according to embodiments of FIG. 7.

It will also be understood that various combinations of dynamic tags and derived tags may be used in order to manage the selective sending of campaign messages according to various embodiments described herein. Accordingly, a "derived and dynamic" tag may have a value that is calculated for the potential recipient and changes over time based on a characteristic of the potential recipient at a given time.

Feedback

Various embodiments that will now be described can send tags to recipients and may obtain recipient feedback based on the tags.

Figure 8:
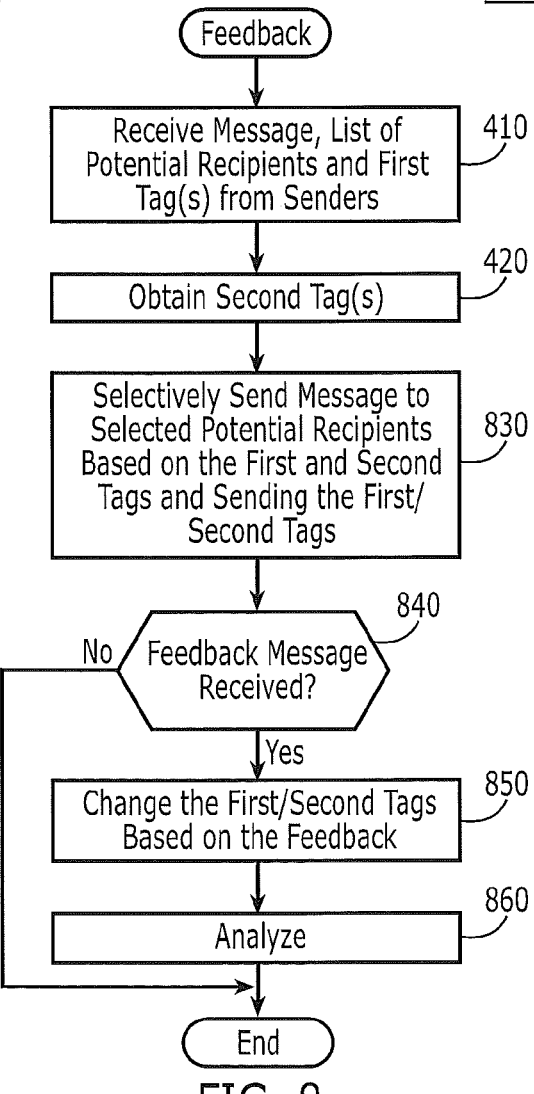
FIGS. 8 and 9 are flowcharts of operations that may be performed to provide tagging with feedback according to various embodiments described herein.

FIG. 8 is a flowchart of operations that may be performed for tagging with feedback in an ESP environment, which may be based on operations of FIG. 4. Referring to FIG. 8, operations of Blocks 410 and 420 are performed. Then, at Block 830, operations of Block 430 are performed with the addition of sending the first and/or second tags to the selected potential recipients. In some embodiments, the first and/or second tags may be sent to the selected recipients as part of a message that is selectively sent, for example in a banner that is associated with the message. However, in other embodiments, the first and/or second tags may be sent and/or accessed separately from the message. For example, the message may include a button to allow the recipient to view or change tags, and the tags may be accessed and/or changed in response to user activation of the button. Many other embodiments may be provided for separately accessing the tags by a recipient.

More specifically, it may be desirable for a recipient to be exposed to at least some of the tags, to allow the recipient to change or update the tag if it is in error and/or to use the tag to indicate that they do or do not wish to receive subsequent messages. Accordingly, in some embodiments of Block 830, the email message that is received from the sender is selectively sent to the selected potential recipients as well as the first and/or second tags. At Block 840, if feedback is not desired, operations end.

Alternatively, at Block 840, if feedback is desired, the ESP sending engine may be further configured to receive a message from a selected potential recipient to change a first and/or second tag that was sent. In response, the ESP sending engine may be configured to change the first and/or second tag for the selected potential recipient in response to the message, at Block 850. Moreover, at Block 860, the ESP sending engine may be further configured to analyze responsiveness of the potential recipient to the emails that were sent as a function of the first and/or second tags. This analysis may be helpful to determine, for example, that the algorithms that are being used to obtain a dynamic and/or derived tag may be incorrect. For example, the analysis may determine that the default gender for a given name should be changed, that an assumed zip code for an IP address is incorrect, etc. Analysis may also be used for other purposes, such as determining and/or updating a confidence level that is associated with a tag.

In an example, a potential recipient may be exposed to a dynamic tag that relates to a weather-feature tag, and may indicate that they desire to receive future messages, notwithstanding that the messages apply to a different weather feature. In another example, a dynamic tag may comprise an age and/or an age range tag, and a potential recipient may indicate that this age or age range tag is incorrect and/or that the potential recipient wishes to receive emails even though they are intended for recipients outside the recipient's age or age range. In still another example, the tag may be a population density and/or topography-feature tag, and the message recipient may wish to indicate that they wish to receive email messages even though they do not fit in the population density and/or topography-feature tag. In still another example, a derived tag may comprise a gender, marital status and/or ethnicity of the potential recipient, and the potential recipient may wish to correct their gender, marital status and/or ethnicity.

It will be also understood that other tags may be exposed to the potential recipient, but may not be susceptible to updating, absent extraordinary measures. For example, a dynamic "degree of influence" tag may not be updateable by the recipient.

Figure 9:
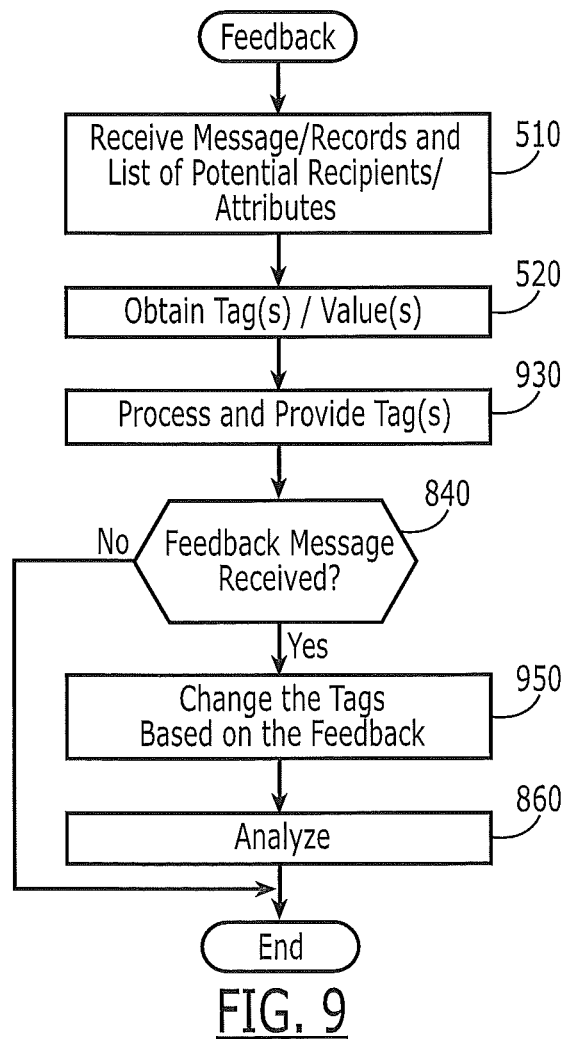

FIG. 9 is a flowchart of feedback in a non-ESP environment that may correspond to embodiments of FIG. 2, 3 or 5. In particular, operations of Blocks 510 and 520 may be performed. Then, the message is sent or the records are processed and the tags and/or records are provided to the recipient at Block 930. At Block 840, if feedback is not desired, operations end. Alternatively, if a feedback message is received at Block 840, then the tags and/or records are changed based on the feedback at Block 950, and the feedback is analyzed as was described above in connection with Block 860.

Additional Discussion

Additional discussion of various embodiments of tagging will now be provided. As was described above, various embodiments described herein allow a message sender to generate tags for a message, and to use these tags to selectively send messages to selected potential recipients. A recipient may also be allowed to feed back changes to the tags. Tags can be helpful for message senders, for message recipients and for ESPs or other intermediate parties.

ESPs conventionally use lists to manage recipients. Lists may be regarded as akin to folders on a hard drive, in that they are static and have items (recipients) manually added and removed from them. Unlike folders, however, many ESPs now allow senders to add recipients to more than one list.

Some ESPs have a second way of grouping recipients dynamically. They allow users to create a named set of criteria and then dynamically generate the list of recipients when the named set is accessed. These dynamic sets may be referred to as "filters" and/or "segments".

Unfortunately, the separation of recipient groupings into lists and filters may create some confusion, because it is not immediately intuitive which to use to organize recipients. For example, if a sender wishes to divide their users into "cat lovers" and "dog lovers", should they create a "cat" list and a "dog" list, and sign up for each? Alternatively, should "cat lover" and "dog lover" be added as a custom property for each recipient and subsequently used in a filter? There may be advantages and disadvantages to each, but once a sender has made the choice to use a list or a filter, it may be difficult to change. Moreover, this separation may create difficulties for ESPs that allow recipients to control their subscription. Specifically, it may be difficult to determine whether recipients can opt-in/opt-out of lists or segments. Moreover, it may be difficult to opt-in/opt-out of a list if the ESP organized recipients by a customer property rather than a list.

Various embodiments described herein can reduce or eliminate the list/filter dichotomy. Much in the same way that Gmail broke the concept of folders in the email client space, and replaced it with labels, various embodiments described herein can eliminate lists and filters and use tags to organize recipients.

In some embodiments, a tag can include a name, a description and a flag that may be set by senders that indicates whether the tag is visible to recipients and whether the recipient is allowed to add/remove the tag in a self-service fashion. Thus, continuing with the above example, a sender may create a tag called "cat lovers" and choose to allow recipients to add or remove a tag from their profile. They may create another tag called, for example, "in-store signup" that is invisible and unchangeable by recipients.

Upon import of new contacts, recipients may choose one or more existing tags to add to the imported contacts, or may optionally define a new one at the time of import. (Tags may include explicit tags, derived tags and dynamic tags. Explicit tags may be defined by the recipient (such as "cat lovers"), by the sender or by the ESP. Derived tags may be generated to assist senders in their marketing activities. Thus, for example, location data, such as zip code or URL address may be used to tag the users as rural, urban or coastal. Moreover, dynamic tags may use location data and dynamic weather data to tag users as "in snow". In another example, name data may be used to tag users as male or female. Imported data may be used to tag users as "new users –30 days" or "last import". Mailing history may be used to tag users as "opens more than 50% of mail". Purchase history may be used to tag users as "bought in last 30 days". As another example, social networking data may be used to tag users as "influential".

Senders may be able to see a list of tags that they are currently using and the number of recipients that belong to each tag. Moreover, in order to assist in the managing of tags, tags may be grouped into categories, such as "geography", and senders can enable or disable tags within the user interface.

Recipients may also be able to modify tags. Senders and/or recipients may be able to combine tags to create filters, for example, "male and rural, but not cat lover". These filters can subsequently be used to send targeted emails and/or to analyze the effect of email campaigns within certain demographics. In some embodiments, offline analysis may be performed on email campaigns using derived filters to determine which filters/tags are relevant for the sender, and subsequently provide marketing suggestions to senders. For example, analysis may determine that urban females are more likely to respond to a particular marketing campaign. Senders will also be able to add tags to emails as they send them. This may help them organize or sort through past campaigns, as well as provide tags for blogging, should they choose to cross-post emails to blogs and/or social networking sites. For example, by virtue of the tags, the sender and/or the ESP may use the tags to search blogs and/or social networking sites to select appropriate blogs and/or social networking messages in which to cross-post the sender emails.

Various embodiments have been described fully herein with reference to the accompanying figures, in which various embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and were described in detail herein. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element or variants thereof, it can be directly responsive or connected to the other element, or intervening elements may be present. In contrast, when an element is referred to as being "directly responsive" or "directly connected" to another element or variants thereof, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s)

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. An Email Service Provider (ESP) server for sending email messages from senders to recipients, the ESP server comprising:
   an email message receiver that is configured to receive an email message and a list of potential recipients for the email message from a sender, the list of potential recipients including a first tag associated therewith that describes a characteristic of the potential recipients;
   a tag generator that is configured to obtain a second tag for the potential recipients that describes a characteristic of the potential recipients and that is different from the first tag; and
   an ESP sending engine that is configured to dynamically select recipients from the list of potential recipients based in part on the first tag received from the sender and the second tag obtained by the tag generator and is configured to selectively send the email message that is received from the sender to the selected recipients in the list of potential recipients.

2. An ESP server according to claim 1 wherein one or more of the first or the second tags comprise a dynamic tag having a value that changes over time based upon a characteristic of a potential recipient at a given time.

3. An ESP server according to claim 2:
   wherein the characteristic of the potential recipient comprises a geolocation of the potential recipient and wherein the dynamic tag comprises a weather-feature tag;
   wherein the characteristic of the potential recipient comprises a birth date of the potential recipient and wherein the dynamic tag comprises an age or age range tag;
   wherein the characteristic of the potential recipient comprises an email response history of the potential recipient and wherein the dynamic tag comprises an email responsiveness tag; or
   wherein the characteristic of the potential recipient comprises social networking data and wherein the dynamic tag comprises a degree of influence tag.

4. An ESP server according to claim 2 wherein the characteristic of the potential recipient comprises an email response history of the potential recipient and wherein the dynamic tag comprises an email responsiveness tag.

5. An ESP server according to claim 2 wherein the characteristic of the potential recipient comprises social networking data and wherein the dynamic tag comprises a degree of influence tag.

6. An ESP server according to claim 1 wherein one or more of the first or the second tags comprise a derived tag having a value that is calculated for the potential recipient.

7. An ESP server according to claim 6:
wherein the list of potential recipients comprises a geolocation of the potential recipients and wherein the derived tag comprises a population density tag or topography-feature tag; or
wherein the list of potential recipients comprises names of the potential recipients and wherein the derived tag comprises a gender, marital status or ethnicity of the potential recipients.

8. An ESP server according to claim 1 wherein the ESP sending engine is configured to selectively send the email message that is received from the sender, and one or more of the first or the second tags, to the selected recipients.

9. An ESP server according to claim 8:
wherein the ESP sending engine is further configured to receive a message from a selected recipient to change one or more of the first or the second tags that were received; and
wherein the ESP sending engine is further configured to change the one or more of the first or the second tags for the selected recipient in response to the message.

10. An ESP server according to claim 1 wherein one or more of the first or the second tags comprise an explicit tag having a value that is not calculated and does not change due to passage of time.

11. An ESP server according to claim 1 wherein the ESP sending engine is further configured to analyze responsiveness of the potential recipients to the emails that were received, as a function of one or more of the first or the second tags.

12. An electronic message server for sending electronic messages from senders to recipients, the electronic message server comprising:
an electronic message receiver that is configured to receive an electronic message and a list of potential recipients for the electronic message from a sender, the list of potential recipients also including a first tag associated therewith that describes a characteristic of the potential recipients;
a tag generator that is configured to obtain a second tag for the potential recipients that describes a characteristic of the potential recipients and that is different from the first tag; and
a sending engine that is configured to dynamically select at least one recipient from the list of potential recipients based in part on the first tag received from the sender and the second tag obtained by the tag generator and selectively send the electronic message that is received from the sender to the dynamically selected at least one recipient in the list of potential recipients.

13. An electronic message server according to claim 12 wherein the electronic messages comprise email, voicemail, text messages or multimedia messages.

14. An electronic message server according to claim 12 wherein the first tag or the second tag comprises a dynamic tag having a value that changes over time based upon a characteristic of a potential recipient at a given time.

15. An electronic message server according to claim 12 wherein the first tag or the second tag comprises a derived tag having a value that is calculated for a potential recipient.

16. An electronic message server according to claim 12:
wherein the sending engine is configured to selectively send the electronic message that is received from the sender, and the first tag or the second tag, to the dynamically selected at least one recipient;
wherein the sending engine is further configured to receive a message from a dynamically selected recipient to change the first tag or the second tag that was received; and
wherein the sending engine is further configured to change the first tag or the second tag for the dynamically selected recipient in response to the message.

17. A method for sending email messages from senders to recipients, the method comprising:
receiving, by at least one of one or more computing devices, an email message and a list of potential recipients for the email message from a sender, the list of potential recipients including a first tag associated therewith that describes a characteristic of the potential recipients;
obtaining, by at least one of the one or more computing devices, a second tag for the potential recipients that describes a characteristic of the potential recipients and that is different from the first tag;
dynamically selecting, by at least one of the one or more computing devices, at least one recipient from the list of potential recipients based in part on the first tag received from the sender and the second tag that was obtained; and
selectively sending, by at least one of the one or more computing devices, the email message that is received from the sender to the dynamically selected at least one recipient in the list of potential recipients.

18. A method according to claim 17 wherein the first talc or the second tag comprises a dynamic tag having a value that changes over time based upon a characteristic of a potential recipient at a given time.

19. A method according to claim 17 wherein the first tag or the second tag comprises a derived tag having a value that is calculated for a potential recipient.

20. A method according to claim 17:
wherein selectively sending the email message comprises selectively sending the email message that is received from the sender, and the first tag or the second tag, to the dynamically selected at least one recipient; the method further comprising:
receiving a message from a selected recipient to change one or more of the first or the second tags that were received; and
changing the one or more of the first or the second tags for the selected recipient in response to the message.

21. An Email Service Provider (ESP) server for sending email messages from senders to recipients, the ESP server comprising:
an email message receiver that is configured to receive an email message and a list of potential recipients for the email message from a sender, the list of potential recipients including a first tag associated therewith that describes a characteristic of the potential recipients;
a tag generator that is configured to obtain a second tag for the potential recipients that describes a characteristic of the potential recipients and that is different from the first tag, wherein the second tag comprises a dynamic tag having a value that changes over time based upon a characteristic of a potential recipient at a given time; and an ESP sending engine that is configured to dynamically select recipients from the list of potential recipients based in part on the first tag received from the sender and the second tag obtained by the tag generator and selectively send the email message that is received from the sender to the selected recipients in the list of potential recipients, wherein the ESP sending engine is further configured to receive a message from at least one of the selected recipients to change the first tag, the second tag, or both, and to change, in response to the message, the first tag, the second tag, or both, for the at least one of the selected recipients.

22. An ESP server according to claim 21 wherein the characteristic of the potential recipient comprises a geolocation of the potential recipient and wherein the dynamic tag comprises a weather-feature tag.

23. An electronic message server for sending electronic messages to recipients, the electronic message server comprising:

an electronic message receiver that is configured to store an electronic message, a list of potential recipients for the electronic message and an associated characteristic of the potential recipients in the list;

a tag generator that is configured to generate a tag for the potential recipients from the associated characteristic of the potential recipients that is stored; and a sending engine that is configured to dynamically select at least one recipient from the list of potential recipients based in part on the tag generated by the tag generator and selectively send the electronic message to the selected at least one recipient in the list of potential recipients.

24. An electronic message server according to claim 23:

wherein the tag comprises a dynamic tag having a value that changes over time based upon a characteristic of a potential recipient at a given time; or wherein the tag comprises a derived tag having a value that is calculated for the potential recipient.

25. An electronic message server for sending electronic messages to recipients, the electronic message server comprising:

an electronic message receiver that is configured to store an electronic message, a list of potential recipients for the electronic message and an associated characteristic of the potential recipients in the list;

a dynamic tag generator that is configured to generate from the associated characteristic a dynamic tag for the potential recipients, the dynamic tag for a given potential recipient having a value that changes over time, and to update the values of the dynamic tag for the potential recipients based on a current time; and a sending engine that is configured to dynamically select at least one recipient from the list of potential recipients based in part on the dynamic tag for the list of potential recipients, the value of which was updated by the dynamic tag generator based on the current time, and selectively send the electronic message to the selected at least one recipient at the current time.

26. An electronic message server according to claim 25:

wherein the characteristic of the potential recipient comprises a geolocation of the potential recipient and wherein the dynamic tag comprises a weather-feature tag;

wherein the characteristic of the potential recipient comprises a birth date of the potential recipient and wherein the dynamic tag comprises an age or age range tag;

wherein the characteristic of the potential recipient comprises an email response history of the potential recipient and wherein the dynamic tag comprises an email responsiveness tag; or wherein the characteristic of the potential recipient comprises social networking data and wherein the dynamic tag comprises a degree of influence tag.

27. An electronic message server for sending electronic messages to recipients, the electronic message server comprising:

an electronic message receiver that is configured to store an electronic message, a list of potential recipients for the electronic message and an associated characteristic of the potential recipients in the list;

a derived tag generator that is configured to calculate a derived tag for the potential recipients from the associated characteristic of the potential recipients in the list; and a sending engine that is configured to dynamically select at least one recipient from the list of potential recipients based in part on the derived tag calculated by the derived tag generator and selectively send the electronic message to the selected at least one recipient.

28. An electronic message server according to claim 27:

wherein the list of potential recipients comprises a geolocation of the potential recipients and wherein the derived tag comprises a population density tag and/or topography-feature tag; or wherein the list of potential recipients comprises names of the potential recipients and wherein the derived tag comprises a gender, marital status or ethnicity of the potential recipients.

* * * * *

UNITED STATES PATENT AND TRADEMARK OFFICE
CERTIFICATE OF CORRECTION

Page 1 of 1

PATENT NO. : 8,799,379 B1
APPLICATION NO. : 12/979940
DATED : August 5, 2014
INVENTOR(S) : Liden et al.

It is certified that error appears in the above-identified patent and that said Letters Patent is hereby corrected as shown below:

In The Claims

At column 16, line 39, replace "first talc" with --first tag-- in claim 18.

Signed and Sealed this
Twenty-fourth Day of March, 2015

Michelle K. Lee
*Director of the United States Patent and Trademark Office*